United States Patent
Hirakawa et al.

(10) Patent No.: US 10,710,324 B2
(45) Date of Patent: Jul. 14, 2020

(54) MANUFACTURING METHOD OF HONEYCOMB STRUCTURE FORMING DIE, AND HONEYCOMB STRUCTURE FORMING DIE

(71) Applicant: NGK INSULATORS, LTD., Nagoya (JP)

(72) Inventors: Toshihiro Hirakawa, Nagoya (JP); Toshio Yamada, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 452 days.

(21) Appl. No.: 15/415,054

(22) Filed: Jan. 25, 2017

(65) Prior Publication Data
US 2017/0259460 A1 Sep. 14, 2017

(30) Foreign Application Priority Data
Mar. 11, 2016 (JP) .................. 2016-048027

(51) Int. Cl.
*B29D 99/00* (2010.01)
*B29C 48/11* (2019.01)
*B29C 48/30* (2019.01)
*B29L 31/60* (2006.01)
(Continued)

(52) U.S. Cl.
CPC .......... *B29D 99/0089* (2013.01); *B29C 48/11* (2019.02); *B29C 48/30* (2019.02); *B29C 48/022* (2019.02); *B29D 99/0003* (2013.01); *B29L 2031/608* (2013.01); *B29L 2031/757* (2013.01)

(58) Field of Classification Search
CPC ............ B29D 99/0089; B29D 99/0003; B29C 47/0028; B29C 47/12; B29C 47/0004; B29L 2031/608; B29L 2031/757
See application file for complete search history.

(56) References Cited

U.S. PATENT DOCUMENTS

| | | |
|---|---|---|
| 4,139,144 A | 2/1979 | Cunningham |
| 6,343,923 B1 | 2/2002 | Cunningham et al. |
| 7,997,888 B2 | 8/2011 | Kitamura et al. |

(Continued)

FOREIGN PATENT DOCUMENTS

| | | |
|---|---|---|
| JP | S54-083013 A | 7/1979 |
| JP | H11-320526 A | 11/1999 |

(Continued)

OTHER PUBLICATIONS

Google Patents, English machine translation of Ando et al. JP H11-320526-A, obtained Dec. 16, 2019 (Year: 2019).*

(Continued)

*Primary Examiner* — Michael M. Robinson
(74) *Attorney, Agent, or Firm* — Burr & Brown, PLLC

(57) ABSTRACT

A manufacturing method of a honeycomb structure forming die includes a linear slit forming step of forming, in a kneaded material discharging surface of a die substrate, a plurality of linear slits which are straight from one end to the other end on the kneaded material discharging surface, a slit sealing material disposing step of disposing a slit sealing material in parts of the plurality of linear slits, and a back hole forming step of forming back holes to introduce a kneaded material, in a kneaded material introducing surface of the die substrate which is present on a side opposite to the kneaded material discharging surface.

4 Claims, 10 Drawing Sheets

(51) Int. Cl.
   *B29L 31/00*   (2006.01)
   *B29C 48/00*   (2019.01)

(56) References Cited

U.S. PATENT DOCUMENTS

| | | |
|---|---|---|
| 8,779,332 B2 | 7/2014 | Hayashi et al. |
| 9,162,302 B2 | 10/2015 | Hayashi et al. |
| 2001/0004068 A1 | 6/2001 | Shibagaki et al. |
| 2002/0153356 A1 | 10/2002 | Fujita et al. |
| 2006/0006575 A1* | 1/2006 | Dannoux .............. B28B 3/2636 264/171.1 |
| 2010/0143529 A1 | 6/2010 | Kitamura et al. |
| 2011/0049743 A1* | 3/2011 | Rector .................... B28B 3/24 264/40.3 |
| 2011/0233186 A1 | 9/2011 | Hayashi et al. |
| 2012/0175349 A1 | 7/2012 | Hayashi et al. |

FOREIGN PATENT DOCUMENTS

| | | |
|---|---|---|
| JP | 2001-225312 A | 8/2001 |
| JP | 2010-131872 A1 | 6/2010 |
| JP | 2011-194537 A1 | 10/2011 |
| JP | 2012-125883 A1 | 7/2012 |

OTHER PUBLICATIONS

Japanese Office Action (with English translation), Japanese Application No. 2016-048027, dated Jul. 9, 2019 (6 pages).

* cited by examiner (a)

(b)

MANUFACTURING METHOD OF HONEYCOMB STRUCTURE FORMING DIE, AND HONEYCOMB STRUCTURE FORMING DIE

The present application is an application based on JP-2016-048027 filed on Mar. 11, 2016 with Japan Patent Office, the entire contents of which are incorporated herein by reference.

BACKGROUND OF THE INVENTION

Field of the Invention

The present invention relates to a manufacturing method of a honeycomb structure forming die, and the honeycomb structure forming die. More particularly, the present invention relates to a manufacturing method of a honeycomb structure forming die in which it is possible to manufacture the honeycomb structure forming die excellent in dimensional accuracy at low manufacturing cost and in short time, and it also relates to the honeycomb structure forming die excellent in dimensional accuracy.

Description of the Related Art

In recent years, there has been the tendency to worldwide strengthen regulations on removal of particulate matter (soot or the like) or toxic substances included in an exhaust gas emitted from an internal combustion engine, a boiler or the like. Attention is attracted to honeycomb structures as a filter to remove the particulate matter and the toxic substances from the exhaust gas, and a catalyst carrier, and there have been suggested a large variety of exhaust gas purification systems including the honeycomb structure. In the above honeycomb structure, for example, porous partition walls define a plurality of cells which become through channels for fluid, and the exhaust gas is purified by the porous partition walls, a catalyst loaded onto the partition walls, and the like.

The honeycomb structure can be manufactured by, for example, extruding a kneaded material by use of an extruder to which a honeycomb structure forming die is attached. Hereinafter, the honeycomb structure forming die will be referred to simply as "the die" sometimes. In this die, back holes to introduce the kneaded material and slits communicating with the back holes are formed in a die substrate made of a pure metal, an alloy or the like. Hereinafter, "the back hole" will be referred to "an introducing hole" sometimes. The slit has a shape which is complementary to "a cell sectional shape" of a honeycomb formed body of a precursor of the honeycomb structure, and has a width corresponding to a thickness of partition walls of the honeycomb formed body. In many cases, a diameter of the back hole is larger than the width of the slit and the back hole is disposed at a position at which the slits intersect. According to the extrusion using this die, the kneaded material introduced from the back holes move to the slits having the narrower width, and is extruded from the slits and discharged as the honeycomb formed body. Further, when the honeycomb formed body is fired, the honeycomb structure is obtainable.

Here, for the purposes of decrease of an initial pressure loss of the honeycomb structure, decrease of a pressure loss when particulate matter is deposited, improvement of thermal shock resistance, improvement of durability, and the like, a shape of cells formed in the honeycomb structure becomes complicated. Here, the shape of the cells means the shape of the cells in a cross section of the honeycomb structure which is perpendicular to a cell extending direction thereof. Hereinafter, the shape of the cells will be referred to as "the cell shape" sometimes. As described above, the honeycomb structure is often prepared by the extrusion, and as the cell shape of the honeycomb structure becomes complicated, the shape of the slits formed in the die for use in preparing the honeycomb structure also becomes complicated. In general, the die is often made of cemented carbide or the like to decrease wear due to use. For the purpose of processing the slits having a fine width into a desirable shape in the die substrate made of cemented carbide having a high wear resistance, a high processing technology is required, and manufacturing of the die might require much manufacturing cost and long time. In the die, the slits through which the kneaded material is extruded to form the partition walls are formed by grind processing with a grinding wheel or the like, wire discharge processing, or discharge processing using electrodes made of a dischargeable material such as a copper-tungsten alloy or carbon graphite (e.g., Patent Documents 1 to 3).

[Patent Document 1] JP-A-2010-131872
[Patent Document 2] JP-A-2011-194537
[Patent Document 3] JP-A-2012-125883

SUMMARY OF THE INVENTION

However, in a case of forming slits by grind processing, a cost aspect is excellent, but linear slits can only be formed, and hence in recent years, it has been difficult to form the slits corresponding to a complicated cell shape. That is, in the case of forming the slits by the grind processing, a slit pattern in which the linear slits are formed in a lattice-like manner can only be formed in the surface of a die. In other words, according to the grind processing, the slits can only be formed continuously along one straight line to repeatedly arrange the slits of a simple rectangular shape (i.e., an inverted cell shape). Consequently, for example, there has been the problem that broken linear slits in which parts of the linear slits on the one straight line are broken cannot be formed by the grind processing.

Furthermore, in wire discharge processing or discharge processing in which electrodes are used, the formation of the slits requires much time, and especially in a case where the cell shape of a formed body to be formed is small and a plurality of short slits are formed, there is the problem that the formation of the slits requires an enormous amount of time. Hereinafter, "the wire discharge processing" and "the discharge processing in which the electrodes are used" will generically be referred to as "the discharge processing" sometimes. Furthermore, in a case of forming the die to prepare a honeycomb structure having a diameter of 120 mm or more, there are large problems in the cost aspect and processing time. Furthermore, it is necessary to change a shape of the electrodes for the discharge processing in accordance with the shape of the slits to be formed, and there is the problem that the electrodes for the discharge processing are poor in versatility. Furthermore, in a case where the slits of a complicated shape are formed by the discharge processing, there is also involved the problem that the slits formed in the die are poor in dimensional accuracy and life of the electrodes is short.

The present invention has been developed in view of such problems. According to the present invention, there is provided a manufacturing method of a honeycomb structure forming die in which it is possible to manufacture the honeycomb structure forming die excellent in dimensional accuracy at low manufacturing cost and in short time.

Furthermore, according to the present invention, there is provided a honeycomb structure forming die excellent in dimensional accuracy.

According to the present invention, there are provided a manufacturing method of a honeycomb structure forming die, and the honeycomb structure forming die as follows.

According to a first aspect of the present invention, a manufacturing method of a honeycomb structure forming die is provided including:

a linear slit forming step of forming, in a kneaded material discharging surface of a die substrate, a plurality of linear slits which are straight from one end to the other end on the kneaded material discharging surface;

a slit sealing material disposing step of disposing a slit sealing material in parts of the plurality of linear slits; and a back hole forming step of forming back holes to introduce a kneaded material, in a kneaded material introducing surface of the die substrate which is present on a side opposite to the kneaded material discharging surface.

According to a second aspect of the present invention, the manufacturing method of the honeycomb structure forming die according to the above first aspect is provided, wherein in the linear slit forming step, all the plurality of linear slits to be formed on the kneaded material discharging surface are formed, and then the slit sealing material disposing step is performed.

According to a third aspect of the present invention, the manufacturing method of the honeycomb structure forming die according to the above first aspect is provided, wherein in the linear slit forming step, among the plurality of linear slits, first linear slits in which the slit sealing material is scheduled to be disposed are formed in parts of the linear slits, the slit sealing material disposing step is performed to the formed first linear slits, and the residual linear slits other than the first linear slits are formed after the slit sealing material disposing step.

According to a fourth aspect of the present invention, the manufacturing method of the honeycomb structure forming die according to any one of the above first to third aspects is provided, wherein a ratio of a linear slit total length which is a total of lengths of the linear slits relative to a slit total length which is a total of lengths of the slits formed in the die substrate is 50% or more.

According to a fifth aspect of the present invention, the manufacturing method of the honeycomb structure forming die according to any one of the above first to fourth aspects is provided, wherein the formation of the linear slits is performed by grind processing.

According to a sixth aspect of the present invention, the manufacturing method of the honeycomb structure forming die according to any one of the above first to fourth aspects is provided, wherein the formation of the linear slits is performed by wire discharge processing.

According to a seventh aspect of the present invention, a honeycomb structure forming die is provided including:

a die substrate having a kneaded material introducing surface in which back holes to introduce a kneaded material are formed, and a kneaded material discharging surface in which a plurality of slits to discharge the kneaded material introduced from the back holes are formed; and a slit sealing material disposed to cut off parts of the slits formed in the die substrate, wherein the slits formed in the die substrate are linear slits which are straight from one end to the other end, and the linear slit includes a kneaded material discharging portion communicating with the back hole, and a sealing portion in which the slit sealing material is disposed to cut off the discharging of the kneaded material, and the kneaded material introduced from the back holes is formed through the kneaded material discharging portions.

In a manufacturing method of a honeycomb structure forming die of the present invention, it is possible to manufacture the honeycomb structure forming die excellent in dimensional accuracy at low manufacturing cost and in short time. Furthermore, the honeycomb structure forming die of the present invention is excellent in dimensional accuracy.

More specifically, the manufacturing method of the honeycomb structure forming die of the present invention includes a linear slit forming step, a slit sealing material disposing step, and a back hole forming step. The linear slit forming step is a step of forming, in a kneaded material discharging surface of a die substrate, a plurality of linear slits which are straight from one end to the other end on the kneaded material discharging surface. Here, the linear slits which are straight from one end to the other end are linear slits including a slit shape scheduled to be formed on the kneaded material discharging surface. Hereinafter, the slit shape scheduled to be formed on the kneaded material discharging surface will be referred to as "a scheduled slit shape" sometimes. The slit sealing material disposing step is a step of disposing a slit sealing material in parts of the plurality of linear slits. The back hole forming step is a step of forming back holes to introduce a kneaded material, in a kneaded material introducing surface of the die substrate which is present on a side opposite to the kneaded material discharging surface.

According to the manufacturing method of the honeycomb structure forming die of the present invention, it is possible to manufacture the honeycomb structure forming die at low cost and in short time. Especially in the die of a complicated slit shape, it is possible to noticeably decrease the manufacturing cost and it is also possible to noticeably decrease time required for manufacturing. For example, in a conventional die manufacturing method, when manufacturing the die of the complicated slit shape, slits having each short side are individually formed by discharge processing or the like and the formed short slits are linked to one another, thereby forming the scheduled slit shape. Consequently, in the conventional die manufacturing method, it might be necessary to prepare special electrodes for the discharge processing and there might be required an enormous amount of processing time to individually form short slits. On the other hand, the manufacturing method of the honeycomb structure forming die of the present invention does not require any special electrodes for the discharge processing or a complicated step of individually forming the short slits, and the straight linear slits may only be formed in the die substrate. Furthermore, according to the manufacturing method of the honeycomb structure forming die of the present invention, it is also possible to manufacture a die through which a large formed body is to be extruded, at low cost and in short time.

Furthermore, in the manufacturing method of the honeycomb structure forming die of the present invention, it is possible to manufacture the die excellent in dimensional accuracy. Especially, it is possible to manufacture even a die of a complicated slit shape or a large die with a high dimensional accuracy. It is possible to easily manufacture, for example, a die of a slit shape formed by repeating a polygonal shape such as a pentangular shape or more or a die of a slit shape formed by combining two or more types of polygonal shapes, with the high dimensional accuracy.

A honeycomb structure forming die of the present invention is the honeycomb structure forming die manufactured by the above-mentioned manufacturing method of the honeycomb structure forming die of the present invention. The honeycomb structure forming die of the present invention includes a die substrate in which linear slits are formed, and a slit sealing material disposed in parts of the linear slits. The linear slits include kneaded material discharging portions communicating with back holes, and sealing portions in which the slit sealing material is disposed to cut off discharging of a kneaded material. Therefore, in a case where extrusion is performed by using the honeycomb structure forming die of the present invention, the kneaded material introduced from the back holes is extruded only from "the kneaded material discharging portions" of the linear slits. It is possible to manufacture the honeycomb structure forming die of the present invention at lost cost even when the die has a complicated slit shape. Furthermore, each of the kneaded material discharging portions between which the sealing portion is sandwiched is one linear slit, and hence the slit shape constituted of the respective kneaded material discharging portions is excellent in dimensional accuracy. Furthermore, in the honeycomb structure forming die of the present invention, even when the slit sealing material is damaged due to wear or the like, it is possible to easily repair the honeycomb structure forming die by changing the broken slit sealing material. Furthermore, the slit sealing material disposed once can be removed and replaced with a new slit sealing material, and hence, for example, it is possible to easily change a position at which the slit sealing material is disposed and to extrude various honeycomb formed bodies with one die substrate.

DESCRIPTION OF THE PREFERRED EMBODIMENTS

Hereinafter, embodiments of the present invention will be described, but the present invention is not limited to the following embodiments. Therefore, it should be understood that the following embodiments to which changes, improvements and others are suitably added on the basis of ordinary knowledge of a person skilled in the art without departing from the gist of the present invention also fall in the scope of the present invention.

Figure 1A:
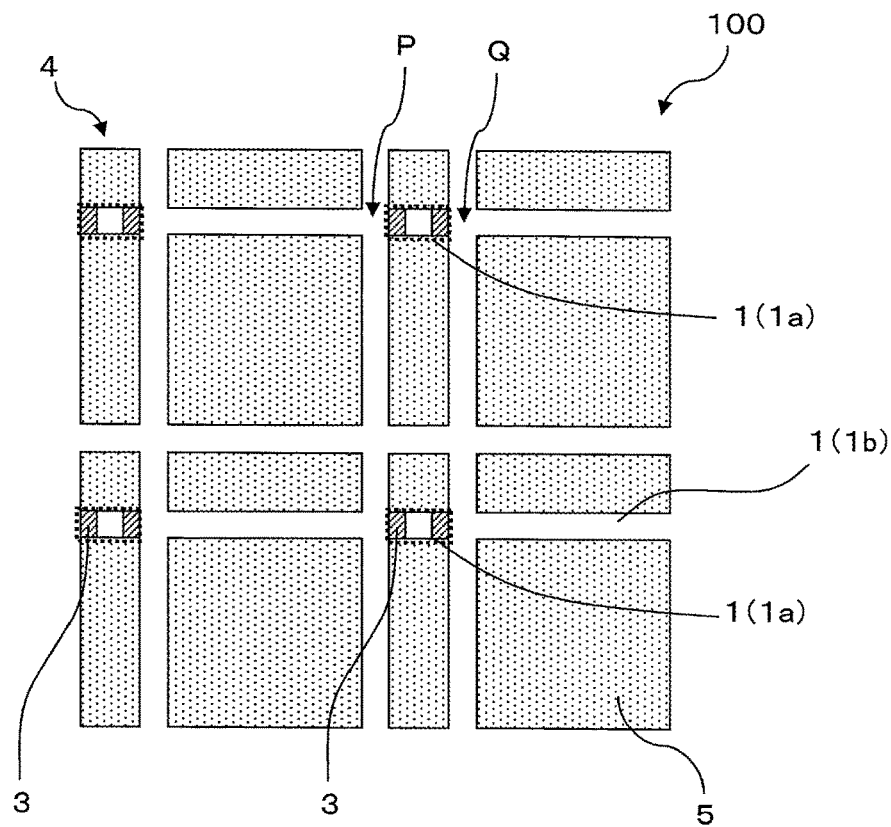
FIG. 1A is a partially enlarged plan view schematically showing a kneaded material discharging surface of a honeycomb structure forming die manufactured by a first embodiment of a manufacturing method of the honeycomb structure forming die of the present invention.
Figure 1B:
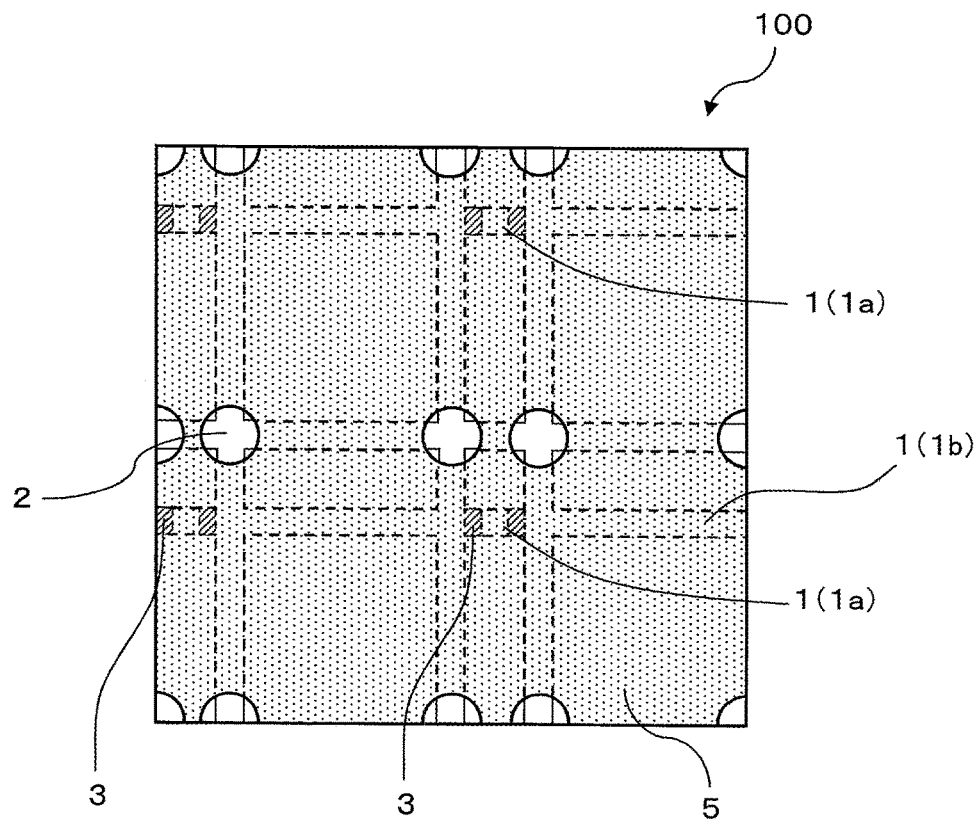
FIG. 1B is a partially enlarged plan view and a partial perspective view schematically showing a kneaded material introducing surface of the honeycomb structure forming die manufactured by the first embodiment of the manufacturing method of the honeycomb structure forming die of the present invention.

(1) Manufacturing Method of Honeycomb Structure Forming Die:

A manufacturing method of a honeycomb structure forming die of the present invention is a manufacturing method to manufacture a honeycomb structure forming die 100 shown in FIG. 1A and FIG. 1B. Here, FIG. 1A is a partially enlarged plan view schematically showing a kneaded material discharging surface of the honeycomb structure forming die manufactured by a first embodiment of the manufacturing method of the honeycomb structure forming die of the present invention. FIG. 1B is a partially enlarged plan view and a partial perspective view schematically showing a kneaded material introducing surface of the honeycomb structure forming die manufactured by the first embodiment of the manufacturing method of the honeycomb structure forming die of the present invention. As shown in FIG. 1A and FIG. 1B, in a honeycomb structure forming die 100, a slit sealing material 3 is disposed in parts of linear slits 1 formed in a die substrate 5.

The manufacturing method of the honeycomb structure forming die of the present invention includes a linear slit forming step, a slit sealing material disposing step, and a back hole forming step. The linear slit forming step is a step of forming a plurality of linear slits which are straight from one end to the other end in the kneaded material discharging surface of the die substrate. The slit sealing material disposing step is a step of disposing the slit sealing material in parts of the linear slits to partially divide the linear slits. The back hole forming step is a step of forming back holes to introduce the kneaded material, in the kneaded material introducing surface of the die substrate which is present on a side opposite to the kneaded material discharging surface.

According to the manufacturing method of the honeycomb structure forming die of the present invention, it is possible to manufacture the honeycomb structure forming die at low cost and in short time. Especially, in a case of manufacturing the die in which the slit shape is complicated, e.g., the die in which the shape of the slits formed in the kneaded material discharging surface is "a shape of a partially divided straight line", it is possible to noticeably decrease manufacturing cost and to noticeably shorten time required for the manufacturing, as compared with a conventional manufacturing method. Furthermore, it is also possible to manufacture a die through which a large formed body is to be extruded at low cost and in short time.

As shown in FIG. 1A and FIG. 1B, the honeycomb structure forming die 100 includes the die substrate 5 and the slit sealing material 3 disposed in parts of linear slits 1 formed in the die substrate 5. The linear slits 1 formed in the die substrate 5 are lattice-like slits formed on a kneaded material discharging surface 4 of the die substrate 5, and include "kneaded material discharging portions 1b" communicating with back holes 2 and "sealing portions 1a" in which the slit sealing material 3 is disposed to cut off the discharging of the kneaded material. A shape of the kneaded material discharging portion 1b on the kneaded material discharging surface 4 is an inverted shape of the formed body to be extruded. That is, when the slit sealing material 3 is disposed in parts of the linear slits 1, a plurality of lattice-like formed linear slits 1 are partially cut off, and a scheduled slit shape is formed on the kneaded material discharging surface 4 of the die substrate 5. Therefore, in a case where the kneaded material is extruded by using the honeycomb structure forming die 100, the kneaded material is extruded only through the kneaded material discharging portions 1b, and the formed body possessing an inverted shape of the kneaded material discharging portions 1b is obtainable.

Figure 2:
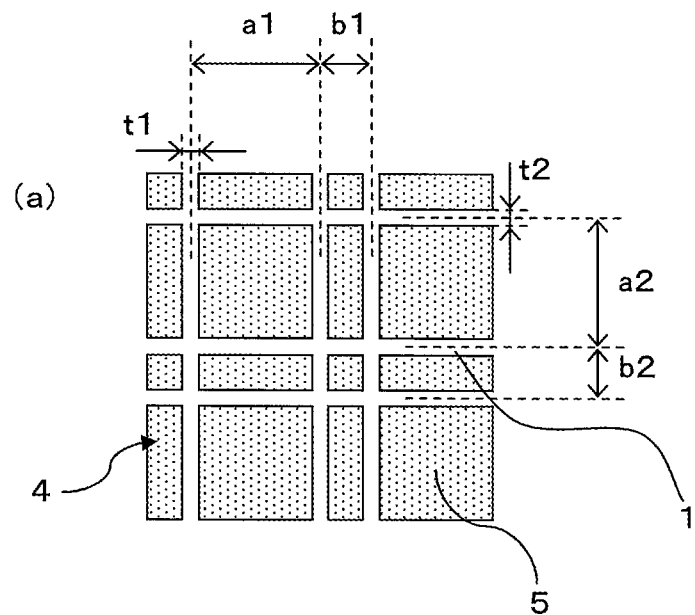
FIG. 2 is an explanatory view to explain the first embodiment of the manufacturing method of the honeycomb structure forming die of the present invention.
Figure 2:
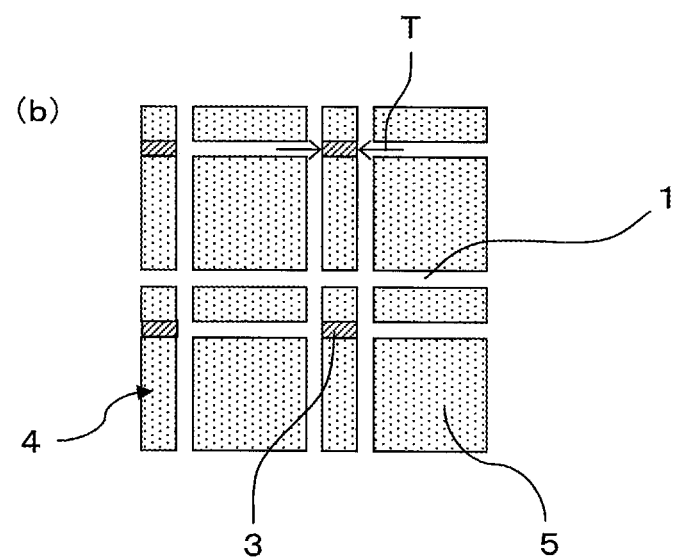

(1-1) Manufacturing Method of Honeycomb Structure Forming Die of First Embodiment:

Hereinafter, the first embodiment of the manufacturing method of the honeycomb structure forming die of the present invention will be described with reference to FIG. 2. FIG. 2 is an explanatory view to explain the first embodiment of the manufacturing method of the honeycomb structure forming die of the present invention. Hereinafter, the manufacturing method of the honeycomb structure forming die of the first embodiment will simply be referred to as the manufacturing method of the first embodiment sometimes.

The manufacturing method of the first embodiment includes a linear slit forming step shown in FIG. 2(a), a slit sealing material disposing step shown in FIG. 2(b), and a back hole forming step (not shown). According to the manufacturing method of the first embodiment, in the linear slit forming step, all the linear slits to be formed on the kneaded material discharging surface are formed, and then the slit sealing material disposing step is performed.

(1-1a) Linear Slit Forming Step:

The linear slit forming step is a step of forming, in the kneaded material discharging surface 4 of the die substrate 5, the plurality of linear slits 1 which are straight from one end to the other end on the kneaded material discharging surface 4 as shown in FIG. 2(a). In the linear slit forming step, a plurality of linear slits 1 in which slits scheduled to be formed on the kneaded material discharging surface 4 are linearly extended are formed as the linear slits 1. The slits scheduled to be formed on the kneaded material discharging surface 4 are slits through which the kneaded material is actually extruded, in the honeycomb structure forming die of a final product. A shape of the slits scheduled to be formed on the kneaded material discharging surface is referred to as "the scheduled slit shape" sometimes.

There is not any special restriction on a forming method of the linear slits. Examples of the forming method of the linear slits include grind processing, wire discharge processing, electrolytic processing, and laser processing. In a case where the grind processing is employed, there is the advantage that the linear slits can be formed more immediately than in the wire discharge processing. It is to be noted that as the forming method of the linear slits, a plurality of processing methods may be used together. For example, in the case of forming the linear slits, the grind processing may be used together with the wire discharge processing.

A width of each linear slit or a depth of the linear slit from a kneaded material forming surface can suitably be set in accordance with a slit width or depth required for the honeycomb structure forming die to be prepared. For example, the width of the linear slit may be, for example, from 0.03 to 1.0 mm. Furthermore, the depth of the linear slit from the kneaded material forming surface may be, for example, from 0.5 to 8.0 mm.

An example of a material of the die substrate is a metal or an alloy usually for use as a material of the honeycomb structure forming die. The example is a metal or an alloy containing at least one selected from the group consisting of iron (Fe), titanium (Ti), nickel (Ni), copper (Cu) and aluminum (Al).

Furthermore, another example of the alloy constituting the die substrate is stainless steel alloy, and more specifically, the example of the alloy is suitably SUS630. Chemical components of SUS630 are as follows. C: 0.07 or less, Si: 1.00 or less, Mn: 1.00 or less, P: 0.040 or less, S: 0.030 or less, Ni: from 3.00 to 5.00, Cr: from 15.50 to 17.50, Cu: from 3.00 to 5.00, Nb+Ta: from 0.15 to 0.45, and Fe: remainder. A unit of each of the above-mentioned chemical components of SUS630 is mass %. Such stainless steel alloy is comparatively easy to be processed and is an inexpensive material.

Furthermore, still another example of the alloy constituting the die substrate is tungsten carbide based cemented carbide excellent in wear resistance, or the like. By use of the die substrate made of tungsten carbide based cemented carbide, it is possible to manufacture the honeycomb structure forming die in which the slits are worn less.

The tungsten carbide based cemented carbide is an alloy containing at least tungsten carbide, and is preferably an alloy prepared by sintering tungsten carbide with at least one selected from the group consisting of iron (Fe), cobalt (Co), nickel (Ni), titanium (Ti), and chromium (Cr). The tungsten carbide based cemented carbide in which at least one metal selected from the above group is used as a bonding material is especially excellent in wear resistance or mechanical strength. Specific examples of tungsten carbide based cemented carbide include tungsten carbide based cemented carbide in which cobalt (Co) is used as the bonding material, and WC—Co (a cobalt content ratio is from 0.1 to 50 mass %).

(1-1b) Slit Sealing Material Disposing Step:

The slit sealing material disposing step is a step of disposing the slit sealing material 3 in parts of the plurality of linear slits 1 as shown in FIG. 2(b). That is, in the slit sealing material disposing step, the slit sealing material 3 is disposed in an excessive portion extended to a portion other than the scheduled slit shape of the linear slit 1 formed in the linear slit forming step. When performing this slit sealing material disposing step, parts of the linear slits 1 formed in the die substrate 5 are defined as "the sealing portions 1a" in which the discharging of the kneaded material is cut off. Further, portions other than "the sealing portions 1a"

become "the kneaded material discharging portions 1*b*" communicating with the back holes 2, and the kneaded material discharging portions 1*b* form the scheduled slit shape of the honeycomb structure forming die.

Here, in the honeycomb structure forming die 100 shown in FIG. 1A, "the sealing portion 1*a*" means a range surrounded with a broken line and denoted with sign 1*a*. That is, the sealing portion 1*a* is a part of the linear slit 1, and a range which does not communicate with the back hole between the slit sealing materials 3 disposed in the linear slit 1 (i.e., the range which is defined by two slit sealing materials 3 and does not communicate with the back hole) becomes the sealing portion 1*a*. On the other hand, "the kneaded material discharging portion 1*b*" means a range constituted by the linear slit 1 other than the sealing portion 1*a*. Further, the honeycomb structure forming die 100 shown in FIG. 1A is constituted so that the kneaded material discharging portions 1*b* of the linear slits 1 communicate with the back holes 2 and so that the kneaded material introduced from the back holes 2 is formed through the kneaded material discharging portions 1*b*. It is to be noted that the back holes 2 are formed at parts of lattice-like intersection points of the linear slits 1. On the other hand, the sealing portion 1*a* defined by the two slit sealing materials 3 does not communicate with the back hole 2 in a state where the discharging of the kneaded material is cut off.

In the honeycomb structure forming die 100 shown in FIG. 1A, the excessive portion of the linear slit 1 is present between "one intersection point P at which two linear slits 1 intersect" and "another intersection point Q adjacent to the one intersection point P". In the honeycomb structure forming die 100, the slit sealing material 3 is disposed between the intersection point P and the intersection point Q so that the excessive portion of the linear slit 1 does not communicate with the back hole 2 (see FIG. 1B), thereby forming the sealing portion 1*a* of the linear slit 1.

There is not any special restriction on a disposing position of the slit sealing material when disposing the slit sealing material, and the slit sealing material may be disposed so that the kneaded material introduced from the back holes of the die is not discharged through the sealing portions of the linear slits. For example, the slit sealing material may be disposed in all the sealing portions of the linear slits, and as long as the discharging of the kneaded material from the sealing portions of the linear slits can be inhibited, the slit sealing material may be disposed only in parts of the sealing portions.

Figure 1C:
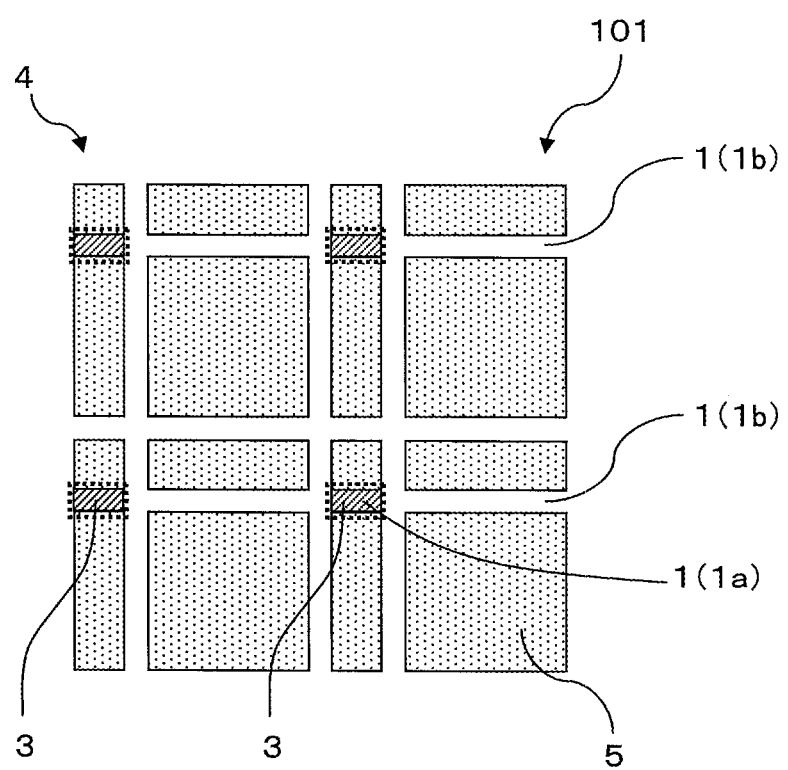
FIG. 1C is a partially enlarged plan view schematically showing a kneaded material discharging surface of another honeycomb structure forming die manufactured by the first embodiment of the manufacturing method of the honeycomb structure forming die of the present invention.

For example, in the honeycomb structure forming die 100 shown in FIG. 1A, the slit sealing material 3 is disposed in both end portions of the sealing portion 1*a* of the linear slit 1, but as shown in FIG. 1C, the slit sealing material 3 may be disposed in all the sealing portions 1*a* of the linear slits 1. Here, FIG. 1C is a partially enlarged plan view schematically showing a kneaded material discharging surface of another honeycomb structure forming die manufactured by the first embodiment of the manufacturing method of the honeycomb structure forming die of the present invention.

There is not any special restriction also on a method of disposing the slit sealing material when disposing the slit sealing material. For example, the slit sealing material may be pressed into a part of the linear slit. Furthermore, the slit sealing material may be bonded to a part of the linear slit with an adhesive or the like. Furthermore, as the slit sealing material, a semi-solid material having fluidity may be used, and the material may be poured into a part of the linear slit, and then solidified to dispose the slit sealing material.

When disposing the slit sealing material, it is preferable to dispose the slit sealing material so that the slit sealing material does not protrude to "a region where the slit sealing material is not to be disposed". However, the slit sealing material might be disposed to protrude to "the region where the slit sealing material is not to be disposed". For example, when the slit sealing material is disposed to protrude to "the region where the slit sealing material is not to be disposed", the slit sealing material might penetrate into the scheduled slit shape (i.e., into the kneaded material discharging portion), and normal formation of the scheduled slit shape might be obstructed. In a case where the slit sealing material is disposed to protrude, a step of removing the protruding portion of the slit sealing material (an excessive slit sealing material removing step) may be performed after the slit sealing material disposing step.

There is not any special restriction on a material of the slit sealing material as long as the material is strong to withstand the extrusion of the honeycomb formed body. An example of the material is a stainless steel alloy, tungsten carbide based cemented carbide or a metal or an alloy containing at least one selected from the group consisting of, iron (Fe), titanium (Ti), nickel (Ni), copper (Cu), and aluminum (Al).

When the slit sealing material is disposed again in the die substrate even in a case where the slit sealing material drops after the honeycomb formed body is extruded, the honeycomb structure forming die is usable again. Furthermore, when strength of the slit sealing material is purposely decreased to easily remove the slit sealing material, the honeycomb structure forming die is usable to extrude various scheduled slit shapes with one die.

In the manufacturing method of the first embodiment, it is preferable that a ratio of a linear slit total length which is a total of lengths of all the linear slits relative to a slit total length which is a total of lengths of all the slits formed in the die substrate is 50% or more. According to such a constitution, it is possible to noticeably decrease manufacturing cost and time of the honeycomb structure forming die. That is, in the manufacturing method of the first embodiment, it is preferable that among the slits in the die of the final product, 50% or more of slits in terms of the slit length are formed by the linear slit forming step and the slit sealing material disposing step which have hitherto been described. It is to be noted that among the slits in the die of the final product, the slits which are smaller than 50% of the slit total length may be formed by a heretofore known method, or the slits may be formed by the linear slit forming step and slit sealing material disposing step which have hitherto been described.

(1-1c) Back Hole Forming Step:

The back hole forming step is a step of forming the back holes to introduce the kneaded material, in the kneaded material introducing surface of the die substrate which is present on the side opposite to the kneaded material discharging surface. The back hole forming step may be performed before or after the linear slit forming step.

The back holes can be formed in conformity with a forming method of the back holes in a heretofore known manufacturing method of the honeycomb structure forming die. The back holes can be formed by a method of electrolytic processing, discharge processing, laser processing, or mechanical processing such as drilling. Among these methods, the electrolytic processing is preferable because it is possible to efficiently and accurately form the back holes.

There is not any special restriction on a shape of the back holes as long as it is possible to guide the introduced kneaded material to the kneaded material discharging portions of the linear slits. It is preferable that a diameter of the back hole is formed to be larger than a width of the slit. According to this constitution, the kneaded material introduced from the back holes moves to the slits narrower than the back holes, and is extruded from the slits and suitably discharged as the honeycomb formed body.

There is not any special restriction on a size of an open end of the back hole, but it is preferable that the size of the back hole is larger than the width of the slit. For example, in a case where the shape of the open end of the back hole is round, a diameter of the open end of the back hole is preferably from 0.3 to 10.0 mm and further preferably from 0.4 to 8.0 mm.

There is not any special restriction on the number of the back holes, and the number can suitably be determined in accordance with a shape of the honeycomb structure forming die to be prepared, or the like. It is preferable that a shape of a space formed by the back holes in the die substrate is a round pillar shape. In this case, a diameter of "a cross section" of the back hole "which is perpendicular to a kneaded material flowing direction" indicates a constant value through the whole back hole.

It is possible to easily manufacture the honeycomb structure forming die by the above-mentioned linear slit forming step, slit sealing material disposing step and back hole forming step. Especially, it is possible to manufacture the large die or the die of the complicated slit shape with a high dimensional accuracy.

Figure 3:
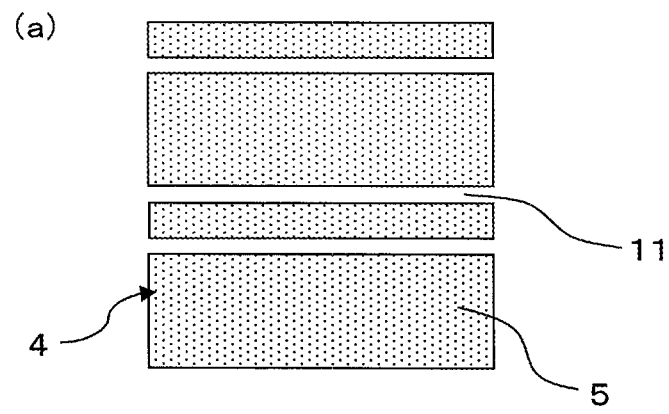
FIG. 3 is an explanatory view to explain a second embodiment of the manufacturing method of the honeycomb structure forming die of the present invention.
Figure 3:
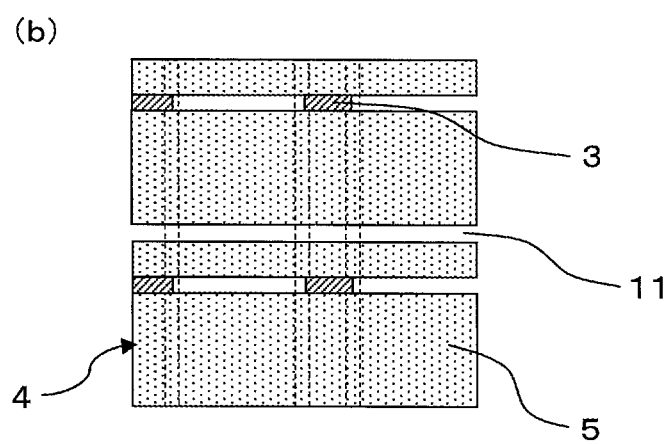
Figure 3:
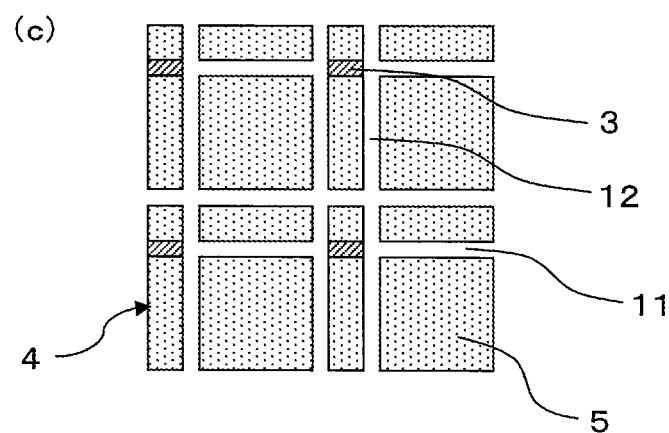

(1-2) Manufacturing Method of Honeycomb Structure Forming Die of Second Embodiment:

Next, a second embodiment of the manufacturing method of the honeycomb structure forming die of the present invention will be described in detail with reference to FIG. 3. FIG. 3 is an explanatory view to explain the second embodiment of the manufacturing method of the honeycomb structure forming die of the present invention. Hereinafter, the manufacturing method of the honeycomb structure forming die of the second embodiment will simply be referred to as the manufacturing method of the second embodiment.

The manufacturing method of the second embodiment is similar to the manufacturing method of the first embodiment in that the method includes a linear slit forming step, a slit sealing material disposing step, and a back hole forming step. However, according to the manufacturing method of the second embodiment, in the linear slit forming step, all linear slits are not formed at once, and first, predetermined linear slits are only formed in advance. Further, relative to the linear slits formed in advance, the slit sealing material disposing step is performed, and then, the linear slit forming step to form the residual linear slits is performed again.

More specifically, in the manufacturing method of the second embodiment, first as shown in FIG. 3(a), first linear slits 11, in parts of which a slit sealing material is scheduled to be disposed among a plurality of linear slits, are formed in a kneaded material discharging surface 4 of a die substrate 5 in the linear slit forming step. Next, as shown in FIG. 3(b), the slit sealing material disposing step is performed to dispose a slit sealing material 3 to the formed first linear slits 11. Next, as shown in FIG. 3(c), a second linear slit forming step is performed to form the residual linear slits (second linear slits 12) other than the first linear slits 11.

The manufacturing method of the second embodiment is different from the manufacturing method of the first embodiment in that as described above, the linear slit forming step is divided to be performed twice or more. In the manufacturing method of the second embodiment, similarly to the hitherto described manufacturing method of the first embodiment, it is possible to manufacture the honeycomb structure forming die at low cost and in short time. Especially, in a case of manufacturing the die in which a slit shape is complicated, it is possible to noticeably decrease manufacturing cost and to also noticeably shorten time required for the manufacturing as compared with a conventional manufacturing method.

Furthermore, according to the manufacturing method of the second embodiment, in a case where the slit sealing material protrudes to "a region" of the first linear slit "where the slit sealing material is not to be disposed", it is possible to remove a protruding portion of the slit sealing material when forming the second linear slits.

Hereinafter, the linear slit forming step to be first performed will be defined as "a first linear slit forming step", a second linear slit forming step to be performed after the slit sealing material disposing step will be defined as "a second linear slit forming step", and the manufacturing method of the second embodiment will be described in more detail.

(1-2a) First Linear Slit Forming Step:

As shown in FIG. 3(a), the first linear slit forming step is a step of forming, in the kneaded material discharging surface 4 of the die substrate 5, a plurality of first linear slits 11 which are straight from one end to the other end on the kneaded material discharging surface 4. The first linear slits 11 are slits in parts of which the slit sealing material 3 is scheduled to be disposed in the next slit sealing material disposing step.

It is preferable that a slit forming method in the first linear slit forming step is a method similar to the method described in the manufacturing method of the first embodiment. A width of each linear slit, a depth of the slit from a kneaded material forming surface, and the like are similar to those in the suitable example of the linear slit forming step of the manufacturing method of the first embodiment.

As shown in FIG. 3(a), the first linear slits 11 formed in the first linear slit forming step are linear slits including "kneaded material discharging portions" and partially including "sealing portions" in the honeycomb structure forming die of a final product. In FIG. 3(a), the linear slits extending in a lateral direction of a paper surface become the first linear slits 11. Selection of the first linear slits 11 to be formed in the first linear slit forming step and second linear slits 12 to be formed in the second linear slit forming step can suitably be determined in accordance with a shape of the honeycomb structure forming die of the final product.

(1-2b) Slit Sealing Material Disposing Step:

The slit sealing material disposing step is a step of disposing the slit sealing material 3 in parts of the first linear slits 11 as shown in FIG. 3(b). This slit sealing material disposing step can be performed in conformity with the slit sealing material disposing step described in the manufacturing method of the first embodiment.

In the slit sealing material disposing step of the manufacturing method of the second embodiment, even when the slit sealing material 3 is disposed to protrude from a range where the slit sealing material is scheduled to be disposed, a protruding portion of the slit sealing material 3 can be removed in the next second linear slit forming step. Consequently, in the manufacturing method of the second embodiment, when disposing the slit sealing material 3, a high positioning accuracy is not required, but the slit sealing material disposing step can more easily be performed. Furthermore, even when the linear slit forming step is divided into the first linear slit forming step and the second linear slit forming step and performed twice, the number of the steps of forming the slits is the same number as in the manufacturing method of the first embodiment. Consequently, in the manufacturing method of the second embodiment, it is possible to remarkably easily manufacture the die with a high dimensional accuracy without substantially involving increase of the number of the steps as compared with the manufacturing method of the first embodiment.

(1-2c) Second Linear Slit Forming Step:

As shown in FIG. 3(c), the second linear slit forming step is a step of forming the second linear slits 12 to the die substrate 5 in which the slit sealing material 3 is disposed in parts of the first linear slits 11. It is preferable that a method of forming the second linear slits 12 is similar to the method of forming the first linear slits 11. It is preferable that the second linear slits 12 intersect the first linear slits 11, and especially it is preferable that the slits are formed to almost touch a region where the slit sealing material 3 is disposed when intersecting the first linear slits 11.

(1-2d) Back Hole Forming Step:

The back hole forming step is a step of forming back holes to introduce a kneaded material, in a kneaded material introducing surface of the die substrate which is present on a side opposite to the kneaded material discharging surface. This back hole forming step can be performed in conformity with the back hole forming step described in the manufacturing method of the first embodiment.

It is possible to easily manufacture the honeycomb structure forming die by the first linear slit forming step, the slit sealing material disposing step, the second linear slit forming step and the back hole forming step as described above. Especially, it is possible to manufacture a large die or a die of a complicated slit shape with a high dimensional accuracy.

(2) Honeycomb Structure Forming Die:

Next, an embodiment of the honeycomb structure forming die of the present invention will be described.

First, one embodiment of the honeycomb structure forming die of the present invention is a honeycomb structure forming die manufactured by the hitherto described manufacturing method of the first embodiment, and is the honeycomb structure forming die 100 shown in FIG. 1A and FIG. 1B.

As shown in FIG. 1A and FIG. 1B, the honeycomb structure forming die 100 includes the die substrate 5 and the slit sealing material 3 disposed in parts of the linear slits 1 formed in the die substrate 5. The linear slits 1 formed in the die substrate 5 are lattice-like slits formed on the kneaded material discharging surface 4 of the die substrate 5, and include "the kneaded material discharging portions 1b" communicating with the back holes 2 and "the sealing portions 1a" in which the slit sealing material 3 is disposed to cut off the discharging of the kneaded material. The shape of the kneaded material discharging portion 1b on the kneaded material discharging surface 4 is an inverted shape of the formed body to be extruded. That is, when the slit sealing material 3 is disposed in parts of the linear slits 1, the plurality of lattice-like formed linear slits 1 are partially cut off, and the scheduled slit shape is formed on the kneaded material discharging surface 4 of the die substrate 5. In the case where the kneaded material is extruded by using the honeycomb structure forming die 100, the kneaded material is extruded only through the kneaded material discharging portions 1b, and the formed body possessing the inverted shape of the kneaded material discharging portions 1b is obtainable.

There is not any special restriction on a thickness of the slit sealing material, and the slit sealing material may be disposed in the linear slits so that the kneaded material is not discharged from the sealing portions of the linear slits. The thickness of the slit sealing material can suitably be determined in accordance with a cell shape of the honeycomb formed body to be extruded, or the like. It is to be noted that the thickness of the slit sealing material is the thickness of the slit sealing material in an extending direction of the linear slits in which the slit sealing material is disposed, on the kneaded material discharging surface. As shown in FIG. 1A and FIG. 1B, in the honeycomb structure forming die 100, the slit sealing material 3 is disposed in both end portions of the sealing portion 1a of the linear slit 1. The thickness of the slit sealing material is preferably 0.2 mm or more and further preferably from 0.4 to 3.0 mm. When the thickness of the slit sealing material is excessively small, the slit sealing material might become easy to be removed or easy to be deformed.

An example of the material of the die substrate is a metal or an alloy usually for use as the material of the honeycomb structure forming die. The example of the material is a metal or an alloy containing at least one selected from the group consisting of iron (Fe), titanium (Ti), nickel (Ni), copper (Cu) and aluminum (Al). It is to be noted that the metal or the alloy constituting this die substrate further preferably contains additives such as carbon (C), silicon (Si), chromium (Cr), manganese (Mn), molybdenum (Mo), platinum (Pt) and palladium (Pd).

Furthermore, another example of the alloy constituting the die substrate is stainless steel alloy, and more specifically, the example of the alloy is suitably SUS630. Such stainless steel alloy is comparatively easy to be processed and is an inexpensive material. Furthermore, the die substrate may be made of tungsten carbide based cemented carbide excellent in wear resistance. This die substrate is capable of decreasing wears on the slits.

There is not any special restriction on the material of the slit sealing material as long as the material is strong to withstand the extrusion of the honeycomb formed body. An example of the material is a stainless steel alloy, tungsten carbide based cemented carbide or a metal or an alloy containing at least one selected from the group consisting of, iron (Fe), titanium (Ti), nickel (Ni), copper (Cu), and aluminum (Al). Furthermore, the slit sealing material may be pressed into parts of the linear slits, welded to parts of the linear slits, or bonded to parts of the linear slits with an adhesive or the like. Furthermore, as the slit sealing material, a semi-solid material having fluidity may be used, and the material may be poured into parts of the linear slits, and then solidified to form. Alternatively, a member such as a brazing material which melts at a high temperature may be poured and cooled to solidify, thereby forming the slit sealing material.

Figure 4A:
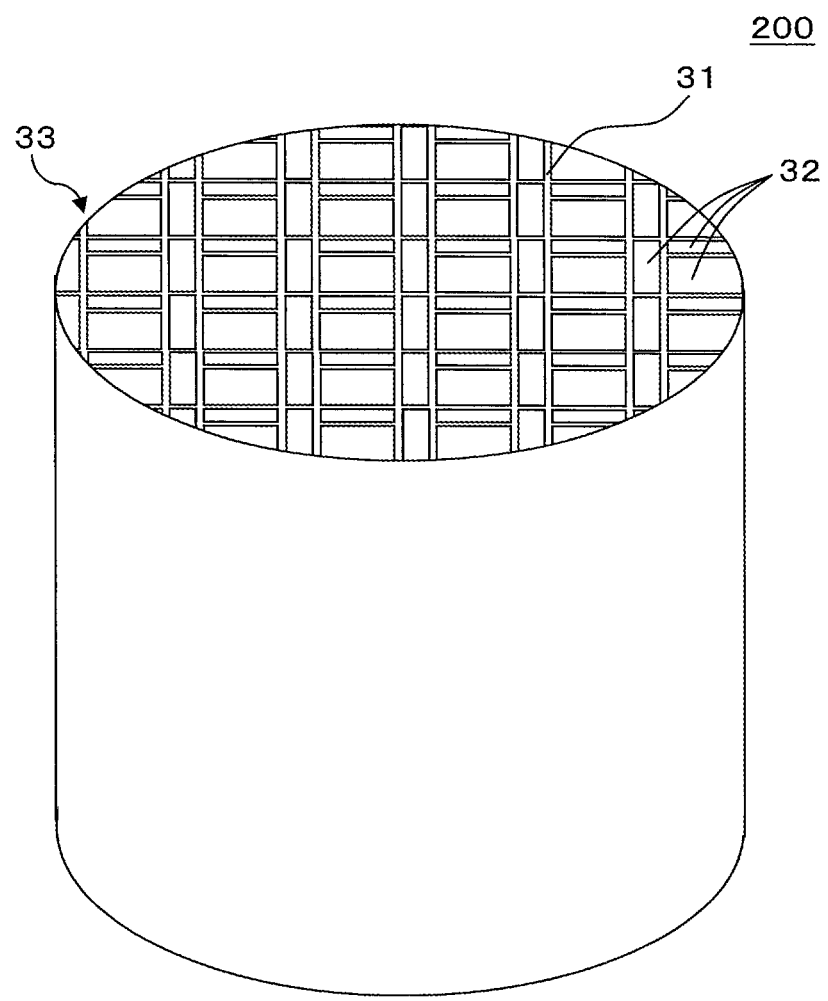
FIG. 4A is a perspective view schematically showing a honeycomb formed body formed by using the honeycomb structure forming die shown in FIG. 1A.
Figure 4B:
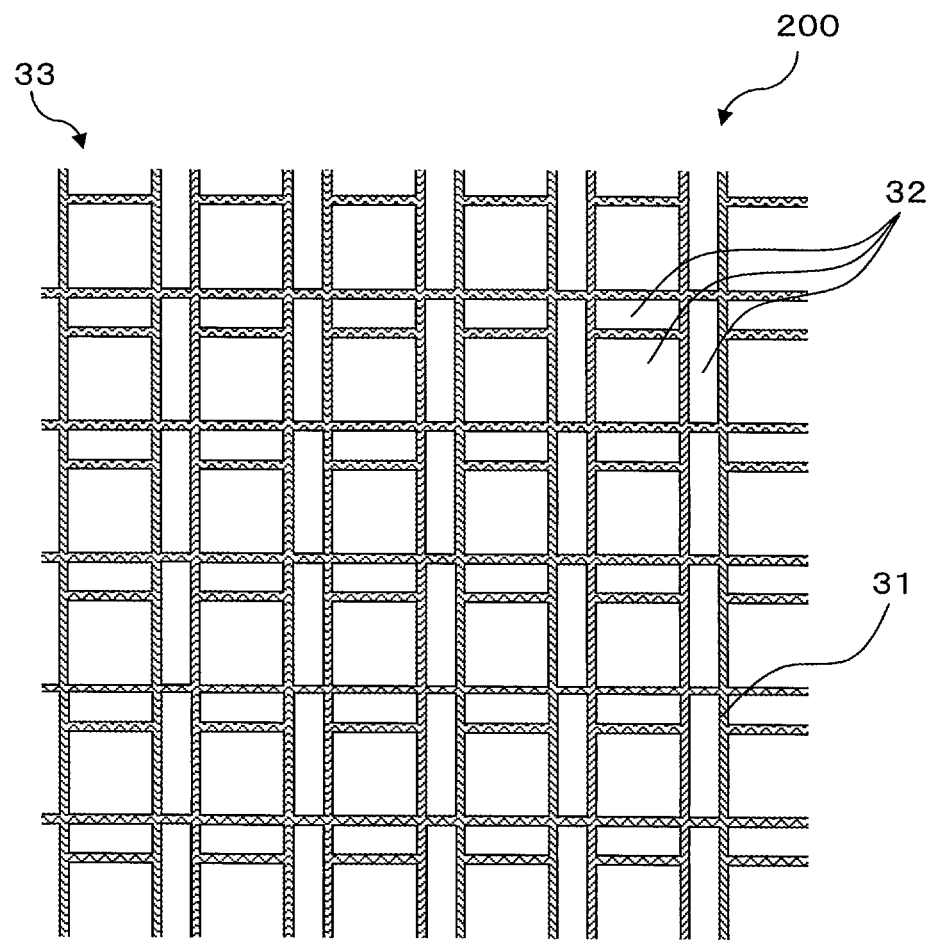
FIG. 4B is a partially enlarged view schematically showing a first end face of the honeycomb formed body shown in FIG. 4A.

The honeycomb structure forming die of the present embodiment is usable in extruding the kneaded material including a ceramic raw material and the like to form the honeycomb formed body. The obtained honeycomb formed body is dried and fired, thereby making it possible to manufacture a honeycomb structure including porous partition walls. The honeycomb structure forming die can be attached to a heretofore known extruder for use. For example, when forming the honeycomb formed body by use of the honeycomb structure forming die shown in FIG. 1A, a honeycomb formed body 200 shown in FIG. 4A and FIG. 4B is obtainable. FIG. 4A is a perspective view schematically showing the honeycomb formed body formed by using the honeycomb structure forming die shown in FIG. 1A.

FIG. 4B is a partially enlarged view schematically showing a first end face of the honeycomb formed body shown in FIG. 4A.

The honeycomb formed body 200 shown in FIG. 4A and FIG. 4B has a honeycomb structure in which a plurality of cells 32 are defined by partition walls 31. The plurality of cells 32 have a repeated arrangement of the cells 32 including two types of large and small rectangular cells 32 and one large square cell 32. There is not any special restriction on types of kneaded material for use in preparing the honeycomb formed body. An example of the kneaded material for use in preparing the honeycomb formed body is a kneaded material containing a cordierite forming raw material, titania, mullite, alumina, spinel, silicon carbide, a silicon-silicon carbide composite material, aluminum titanate, vanadium and zeolite for use in a manufacturing method of a heretofore known honeycomb structure.

Next, another embodiment of the honeycomb structure forming die of the present invention will be described with reference to a honeycomb structure forming die 101 shown in FIG. 1C. In the honeycomb structure forming die 101 shown in FIG. 1C, the whole sealing portion 1a of a linear slit 1 is sealed with a slit sealing material 3. Another constitution of the honeycomb structure forming die 101 show in FIG. 1C is preferably similar to the honeycomb structure forming die 100 shown in FIG. 1A.

Figure 5A:
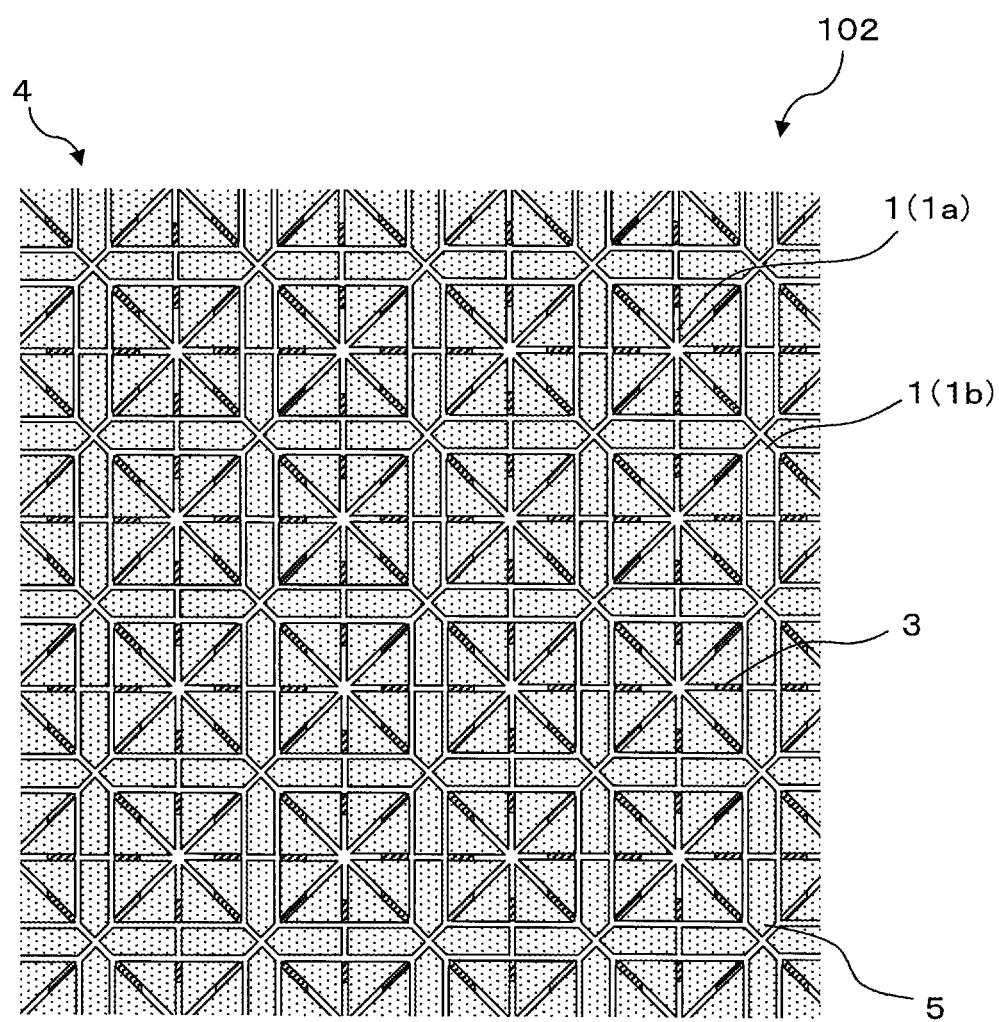
FIG. 5A is a partially enlarged plan view schematically showing a kneaded material discharging surface of a honeycomb structure forming die manufactured by the manufacturing method of the honeycomb structure forming die of the present invention.
Figure 5B:
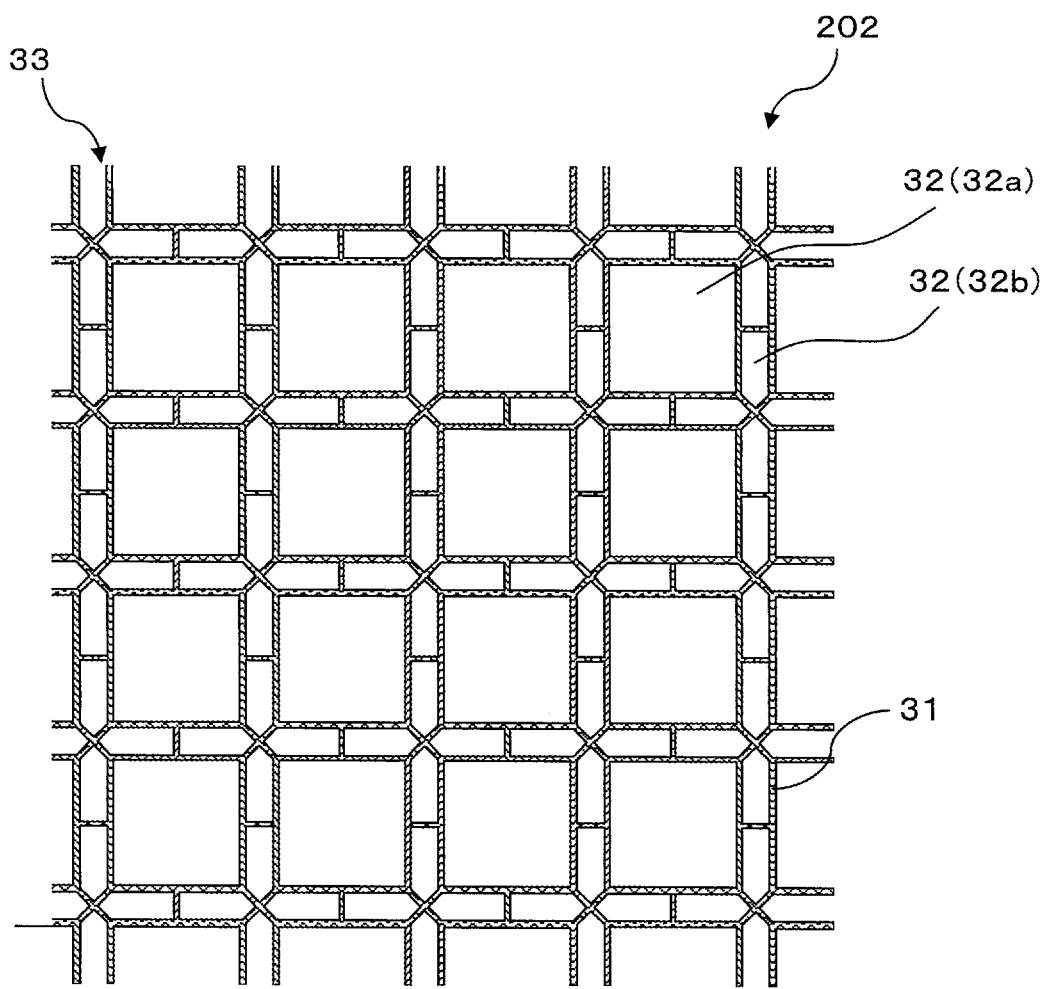
FIG. 5B is a partially enlarged view of a first end face schematically showing a honeycomb formed body formed by using the honeycomb structure forming die shown in FIG. 5A.

Next, still another embodiment of the honeycomb structure forming die of the present invention will be described with reference to a honeycomb structure forming die 102 shown in FIG. 5A. FIG. 5A is a partially enlarged plan view schematically showing a kneaded material discharging surface of the honeycomb structure forming die manufactured by the manufacturing method of the honeycomb structure forming die of the present invention. FIG. 5B is a partially enlarged view of a first end face schematically showing a honeycomb formed body formed by using the honeycomb structure forming die shown in FIG. 5A.

In the honeycomb structure forming die 102, a plurality of linear slits 1 are formed to extend in a longitudinal direction, a lateral direction, and an oblique direction of a paper surface of FIG. 5A. Further, a slit sealing material 3 is disposed in parts of the linear slits 1 and the parts of the linear slits 1 become sealing portions 1a. As to the sealing portion 1a of the linear slit 1, in the honeycomb structure forming die 102 shown in FIG. 5A, a range surrounded in a square with the linear slits 1 extending vertically and horizontally along the paper surface of FIG. 5A becomes the sealing portion 1a. Consequently, in the honeycomb structure forming die 102, the slit sealing material 3 is disposed in respective vertexes of the square surrounded with the linear slits 1 and respective intersection points at which the other linear slits intersect respective sides of the square. It is to be noted that the slit sealing material 3 is disposed at the above-mentioned respective vertexes and intersection points so that the slit sealing material does not protrude from the range surrounded in the square, i.e., the linear slits 1 constituting the square. Further, the linear slit 1 which is present out of the range surrounded in the square with the linear slits 1 becomes a kneaded material discharging portion 1b of the linear slit 1. Back holes in the honeycomb structure forming die 102 are formed to avoid the range surrounded in the square with the linear slits 1, and the kneaded material introduced from the back holes is discharged only from the kneaded material discharging portions 1b of the linear slits 1. It is to be noted that the square constituted by the linear slits 1 can be formed by a heretofore known method of electrolytic processing, laser processing or the like. Furthermore, although not shown in the drawing, the lattice-like linear slits are formed to linearly link four sides of each square, the slit sealing material is disposed in the linear slit which linearly links one square portion to the other square portion, and each square constituted by the linear slits may individually be divided.

In a honeycomb formed body 202 shown in FIG. 5B, partition walls 31 define cells 32a in which a sectional shape of cells 32 is quadrangular and cells 32b in which a sectional shape of the cells 32 is pentangular. In the honeycomb formed body 202, the respective cells 32 are arranged so that the pentangular cells 32b surround the quadrangular cells 32a. A shape of the kneaded material discharging portions 1b of the linear slits 1 in the honeycomb structure forming die 102 shown in FIG. 5A is an inverted shape of the honeycomb formed body 202 shown in FIG. 5B.

Figure 6A:
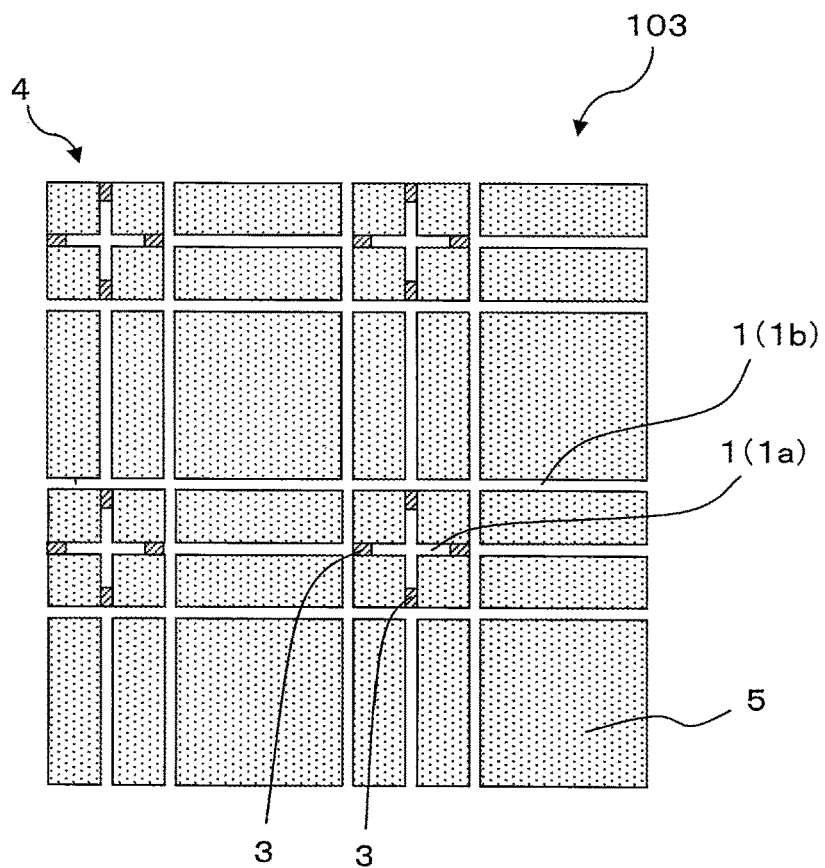
FIG. 6A is a partially enlarged plan view schematically showing a kneaded material discharging surface of the honeycomb structure forming die manufactured by the manufacturing method of the honeycomb structure forming die of the present invention.
Figure 6B:
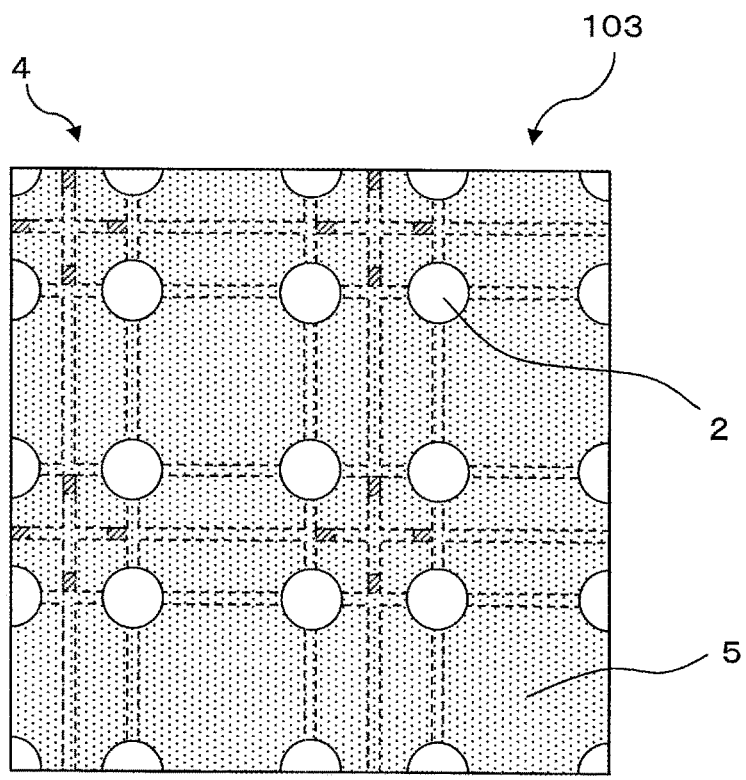
FIG. 6B is a partially enlarged plan view schematically showing a kneaded material introducing surface of the honeycomb structure forming die shown in FIG. 6A.
Figure 6C:
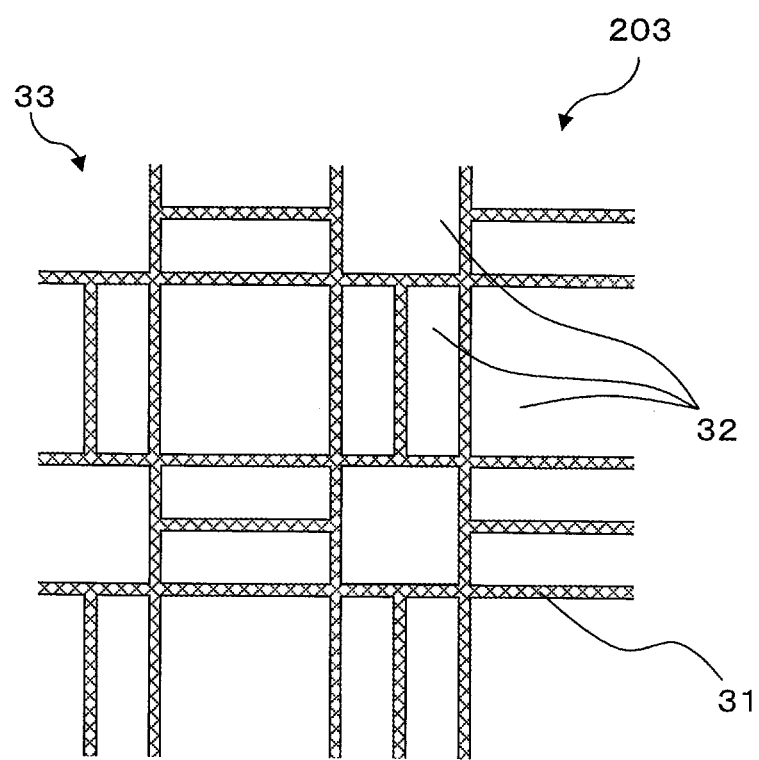
FIG. 6C is a partially enlarged view of a first end face schematically showing a honeycomb formed body formed by using the honeycomb structure forming die shown in FIG. 6A.

Next, a further embodiment of the honeycomb structure forming die of the present invention will be described with reference to a honeycomb structure forming die 103 shown in FIG. 6A and FIG. 6B. FIG. 6A is a partially enlarged plan view schematically showing a kneaded material discharging surface of the honeycomb structure forming die manufactured by the manufacturing method of the honeycomb structure forming die of the present invention. FIG. 6B is a partially enlarged plan view schematically showing a kneaded material introducing surface of the honeycomb structure forming die shown in FIG. 6A. FIG. 6C is a partially enlarged view of a first end face schematically showing a honeycomb formed body formed by using the honeycomb structure forming die shown in FIG. 6A.

In the honeycomb structure forming die 103, a plurality of linear slits 1 are formed to extend in a longitudinal direction and a lateral direction of a paper surface of FIG. 6A. Further, a slit sealing material 3 is disposed in parts of the linear slits 1 and the parts of the linear slits 1 become sealing portions 1a.

In a honeycomb formed body 203 shown in FIG. 6C, cells 32 having three types of different sectional shapes are defined by partition walls 31. The three types of cells having different sectional shapes include a cell whose sectional shape is a small square (a small square cell), a large square cell whose sectional shape is larger than the small square cell (a large square cell), and a cell whose sectional shape is rectangular (a rectangular cell). In the honeycomb formed body 203, a length of about 2 times as much as a length of a short side of a rectangular cell is a length of one side of the small square cell. Furthermore, in the honeycomb formed body 203, a length of a long side of the rectangular cell is equal to a length of one side of the large square cell.

In the honeycomb structure forming die 103 shown in FIG. 6A, the excessive linear slits 1 are formed in a range of a die substrate 5 in which the small square cells are formed, and the slit sealing material 3 is disposed relative to this range, whereby the range in which the small square cell is formed becomes the sealing portion 1a. As shown in FIG. 6B, each back hole 2 in the honeycomb structure forming die 103 is formed to avoid a range in which the sealing portion 1a of the linear slit 1 is formed, i.e., a range in which the small square cell is formed, and the kneaded material introduced from the back holes 2 is discharged only from the kneaded material discharging portions 1b of the linear slits 1.

EXAMPLES

Hereinafter, the present invention will specifically be described with reference to examples, but the present invention is not limited to these examples.

Example 1

In Example 1, there was manufactured a honeycomb structure forming die to extrude a honeycomb formed body having such a shape as shown in FIG. 4B. In Example 1, a plate-shaped die substrate having a longitudinal size of 180 mm, a lateral size of 180 mm and a thickness of 20 mm was prepared. The die substrate made of stainless steel was used.

Next, one surface of the prepared plate-shaped die substrate was defined as a kneaded material discharging surface, and linear slits which were straight from one end to the other end were formed on the side of the kneaded material discharging surface. Specifically, first, the linear slits extending in a longitudinal direction of the kneaded material discharging surface were formed in parallel by grind processing to repeat centers of the linear slits alternately at intervals of 2.5 mm and 1.0 mm as shown by a1 and b1 in FIG. 2(a). Similarly, the linear slits extending in a lateral direction were formed in parallel by the grind processing to repeat centers of the linear slits alternately at intervals of 2.5 mm and 1.0 mm as shown by a2 and b2 in FIG. 2(a). A width of each linear slit was 0.3 mm as shown by t1 and t2 in FIG. 2(a) and its depth from the kneaded material discharging surface was 5 mm.

Next, a plurality of back holes to introduce a kneaded material were formed in a kneaded material introducing surface of the die substrate which was present on a side opposite to the kneaded material discharging surface. The back holes were formed at positions where the kneaded material did not penetrate into sealing portions of the linear slits. Specifically, as to an intersection point between the linear slit extending in the longitudinal direction and the linear slit extending in the lateral direction, the back holes were alternately formed at the intersection points arranged in the longitudinal direction. The back hole had a round pillar shape having a diameter of 0.5 mm and a depth of the back hole was 16 mm from the kneaded material introducing surface. The back holes were formed with a drill.

Next, there was performed a slit sealing material disposing step of disposing a slit sealing material in parts of a plurality of linear slits. Disposing regions of the slit sealing material were positions shown in FIG. 2(b). As the slit sealing material, a stainless steel having a thickness T of 0.7 mm in FIG. 2(b) was used. When disposing the slit sealing material, the stainless steel was pressed into the linear slits.

As described above, the honeycomb structure forming die was manufactured by the manufacturing method of Example 1.

Example 2

Also in Example 2, there was manufactured a honeycomb structure forming die to extrude a honeycomb formed body having such a shape as shown in FIG. 4B. However, in Example 2, a linear slit forming step was divided to be performed twice. Specifically, there was prepared a plate-shaped die substrate having a longitudinal size of 180 mm, a lateral size of 180 mm and a thickness of 20 mm. The die substrate made of a stainless steel was used.

Next, one surface of the prepared plate-shaped die substrate was defined as a kneaded material discharging surface, and linear slits which were straight from one end to the other end were formed on the side of the kneaded material discharging surface. Specifically, the linear slits extending in a lateral direction of the kneaded material discharging surface were only formed in parallel by grind processing to repeat centers of the linear slits alternately at intervals of 1.7 mm and 0.6 mm. A width of each linear slit was 0.16 mm and its depth from the kneaded material discharging surface was 5 mm.

Next, a plurality of back holes having a diameter of 0.4 mm and a depth of 16 mm to introduce a kneaded material were formed with a drill in a kneaded material introducing surface of the die substrate which was present on a side opposite to the kneaded material discharging surface.

Next, there was performed a slit sealing material disposing step of disposing a slit sealing material in parts of a plurality of linear slits. Disposing regions of the slit sealing material were positions shown in FIG. 3(b). A thickness of the slit sealing material was 0.6 mm. As the slit sealing material, a stainless steel was used.

Next, the linear slits extending in a longitudinal direction of the kneaded material discharging surface were formed. The linear slits extending in the longitudinal direction were formed in parallel by grind processing to repeat centers of the respective linear slits alternately at intervals of 1.7 mm and 0.6 mm. A width of each linear slit was 0.16 mm and its depth from the kneaded material discharging surface was 5 mm.

Comparative Example 1

In Comparative Example 1, a honeycomb structure forming die having the same structure and dimension as in Example 1 was manufactured in an inverted shape of such a honeycomb structure as shown in FIG. 4B by discharge processing in which electrodes were used. That is, in Comparative Example 1, the honeycomb structure forming die having the same structure and dimension as in Example 1 was manufactured only by the discharge processing without using any slit sealing materials. As the electrodes for the discharge processing, three types of electrodes were prepared in accordance with lengths of respective slits constituting a slit shape.

Comparative Example 2

Also in Comparative Example 2, a honeycomb structure forming die having the same structure and dimension as in Example 2 was manufactured in an inverted shape of such a honeycomb structure as shown in FIG. 4B. That is, in Comparative Example 2, the honeycomb structure forming die was manufactured only by discharge processing in which electrodes were used without using any slit sealing materials.

(Evaluation 1: Time Required in Manufacturing Honeycomb Structure Forming Die)

A total operation time required in manufacturing the honeycomb structure forming die of Example 1 was compared with that required in manufacturing the honeycomb structure forming die of Comparative Example 1. When setting the total operation time required in manufacturing Example 1, time of 6.5 times as much as that of Example 1 was required in manufacturing the honeycomb structure forming die of Comparative Example 1 which included preparation of the electrodes for the discharge processing. Furthermore, when setting the total operation time required in manufacturing Example 2, time of 7.1 times as much as that of Example 2 was required in manufacturing the honeycomb structure forming die of Comparative Example 2 which included the preparation of the electrodes for the discharge processing.

(Evaluation 2: Dimensional Accuracy of Honeycomb Structure Forming Die)

First, as to the kneaded material discharging surfaces of the honeycomb structure forming dies of Examples 1 and 2 and Comparative Examples 1 and 2, a width of a slit was measured by using a profile projector. The widths of 300 regions at random excluding regions where the slits intersected were measured. A magnification of the profile projector was 100 times. Next, an average value of these measurement values and a standard deviation were calculated. Each average value did not have any problems. However, the standard deviation of Comparative Example 1 was 2.8 times as much as that of Example 1, and the standard deviation of Comparative Example 2 was 3.4 times as much as that of Example 2.

(Result)

As described above, it has been found that in the manufacturing methods of the honeycomb structure forming dies of Examples 1 and 2, it is possible to manufacture the honeycomb structure forming die of the complicated shape in short time and at low cost. Furthermore, it has been found that the honeycomb structure forming dies of Examples 1 and 2 were more excellent in dimensional accuracy than the honeycomb structure forming dies of Comparative Examples 1 and 2.

A manufacturing method of a honeycomb structure forming die of the present invention is utilizable as a method of easily manufacturing a honeycomb structure forming die excellent in dimensional accuracy. Furthermore, the honeycomb structure forming die of the present invention is utilizable as a forming die for various types of honeycomb structures.

DESCRIPTION OF REFERENCE NUMERALS

1: linear slit, 1a: sealing portion, 1b: kneaded material discharging portion, 2: back hole, 3: slit sealing material, 4: kneaded material discharging surface, 5: die substrate, 11: first linear slit, 12: second linear slit, 31: partition wall, 32: cell, 32a: cell (the quadrangular cell), 32b: cell (the pentangular cell), 33: first end face, 100, 101, 102 and 103: honeycomb structure forming die, 200, 202 and 203: honeycomb formed body, and P and Q: intersection point (the intersection point between the linear slits).

What is claimed is:

1. A manufacturing method of a honeycomb structure forming die comprising:
    a linear slit forming step of forming, in a kneaded material discharging surface of a die substrate, a plurality of linear slits which are straight from one end to the other end on the kneaded material discharging surface;
    a slit sealing material disposing step of disposing a slit sealing material in parts of the plurality of linear slits; and
    a back hole forming step of forming back holes to introduce a kneaded material, in a kneaded material introducing surface of the die substrate which is present on a side opposite to the kneaded material discharging surface,
    wherein in the linear slit forming step, among the plurality of linear slits, the parts of the plurality of linear slits in which the slit sealing material is scheduled to be disposed are firstly formed,
    then, the slit sealing material disposing step is performed to the parts of the plurality of linear slits, and
    then, the residual linear slits other than the parts of the plurality of linear slits are formed after the slit sealing material disposing step.

2. The manufacturing method of the honeycomb structure forming die according to claim 1,
    wherein a ratio of a linear slit total length, which is a total of lengths of the linear slits, relative to a slit total length, which is a total of lengths of the-slits formed in the die substrate, is 50% or more.

3. The manufacturing method of the honeycomb structure forming die according to claim 1,
    wherein the formation of the linear slits is performed by grind processing.

4. The manufacturing method of the honeycomb structure forming die according to claim 1,
    wherein the formation of the linear slits is performed by wire discharge processing.

* * * * *